(12) United States Patent
Nurishi

(10) Patent No.: US 7,532,812 B2
(45) Date of Patent: May 12, 2009

(54) LENS APPARATUS

(75) Inventor: Ryuji Nurishi, Utsunomiya-shi (JP)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 11/531,021

(22) Filed: Sep. 12, 2006

(65) Prior Publication Data

US 2007/0058963 A1   Mar. 15, 2007

(30) Foreign Application Priority Data

Sep. 13, 2005   (JP) ............... 2005-266060

(51) Int. Cl.
G03B 17/00 (2006.01)
G03B 3/00 (2006.01)

(52) U.S. Cl. ............... 396/82; 396/71; 396/73; 396/124

(58) Field of Classification Search ............ 396/71–82, 396/111, 123, 124, 128, 133; 348/347, 360–361
See application file for complete search history.

(56) References Cited

U.S. PATENT DOCUMENTS

| | | | |
|---|---|---|---|
| 4,333,716 A | | 6/1982 | Sakane et al. |
| 4,812,912 A | | 3/1989 | Iida et al. |
| 5,130,735 A | * | 7/1992 | Kusaka et al. ............ 396/104 |
| 5,196,877 A | | 3/1993 | Mukai et al. |
| 5,258,798 A | * | 11/1993 | Iida et al. ............ 396/82 |
| 5,604,562 A | | 2/1997 | Aoyama |
| 6,112,029 A | * | 8/2000 | Suda ............ 396/92 |
| 6,154,253 A | * | 11/2000 | Kiri et al. ............ 348/345 |
| 6,445,416 B1 | * | 9/2002 | Kyuma et al. ............ 348/240.3 |
| 6,533,480 B2 | | 3/2003 | Schneider |
| 6,822,801 B2 | | 11/2004 | Yahagi et al. |
| 6,833,538 B2 | | 12/2004 | Sasaki et al. |
| 6,850,280 B2 | * | 2/2005 | Hirasawa et al. ............ 348/350 |
| 2005/0012833 A1 | * | 1/2005 | Yokota et al. ............ 348/240.99 |
| 2005/0254141 A1 | * | 11/2005 | Suzuki et al. ............ 359/696 |
| 2007/0058960 A1 | * | 3/2007 | Kato ............ 396/80 |

FOREIGN PATENT DOCUMENTS

| | | |
|---|---|---|
| JP | 55-076312 A | 6/1980 |
| JP | 58-219505 A | 12/1983 |
| JP | 58-219505 A1 | 12/1983 |
| JP | 59-128506 A | 7/1984 |
| JP | 6-030317 A1 | 2/1994 |

(Continued)

*Primary Examiner*—W. B. Perkey
*Assistant Examiner*—Bret Adams
(74) *Attorney, Agent, or Firm*—Canon USA Inc IP Division

(57) ABSTRACT

A lens apparatus includes an imaging optical system including a focus lens unit, a branching optical unit disposed at the image side of the focus lens unit, a focus-state detecting unit including a focus detecting element having a focus detection area that receives light beams from the branching optical unit, and detecting a focus state by using the focus detecting element, an actuator that drives the focus lens unit in an optical axis direction thereof, a controller that controls the actuator, in accordance with an output from the focus-state detecting unit, and a movable image-side optical unit disposed at the image side of the branching optical unit. The controller changes the size of the focus detection area of the focus detecting element within a range in accordance with the position of the image-side optical unit.

8 Claims, 22 Drawing Sheets

FOREIGN PATENT DOCUMENTS

| | | |
|---|---|---|
| JP | 07-046455 A | 2/1995 |
| JP | 07-191256 A | 7/1995 |
| JP | 08-050227 A | 2/1996 |
| JP | 09-274130 A | 10/1997 |
| JP | 2002-365517 A | 12/2002 |
| JP | 2002-365518 A | 12/2002 |
| JP | 2002-372661 A | 12/2002 |
| JP | 2003-279842 A | 10/2003 |
| JP | 2003-279846 A | 10/2003 |
| JP | 2003-279847 A | 10/2003 |
| JP | 2003-287673 A | 10/2003 |
| JP | 2004-085674 A1 | 3/2004 |

* cited by examiner

LENS APPARATUS

BACKGROUND OF THE INVENTION

1. Field of the Invention

The present invention relates to a lens apparatus which has a branching optical system, disposed in a light path, and which is used for a focusing operation using light beams that have been branched.

2. Description of the Related Art

Various technologies of auto-focusing (AF) in a shooting device, such as a still camera or a video camera, have hitherto been proposed. In particular lens/image pickup devices having a branching optical system disposed in a light path and having a focus detector disposed in a branching light path are known from Japanese Patent Laid-Open Nos. 55-76312, 59-128506, 8-50227, 9-274130, 2002-365517, 2002-365518, 2002-372661, 2003-279842, 2003-279846, 2003-279847, and 2003-287673. Image pickup devices which make variable a focus detection area, which is an area where a length is measured when performing a focusing operation, are discussed in Japanese Patent Laid-Open Nos. 7-46455 and 7-191256.

As discussed in Japanese Patent Laid-Open No. 55-76312 to Japanese Patent Laid-Open No. 2003-287673, in an image pickup system that has a branching optical system disposed in a light path in a focusing optical system and that performs a focusing operation as a result of detecting a focus state by using light beams that have been branched, it is, in principle, necessary to keep the same the relationship between the optical system at the image-pickup side and the optical system at the focus detection side, disposed following the branching optical system. Therefore, when the relationship between a detection value from the focus detector and a focus state at an image-pickup plane is kept the same and focusing with respect to an object near a screen is considered, the relationship between the position of a focus detection area with respect to a predetermined position on an image-pickup screen is kept the same.

Here, it is desirable that the relationship between a focus change amount and a unit operation amount of a focus moving unit have a predetermined relationship. When the relationship between the focus change amount and the unit operation amount is a predetermined relationship, it is possible to set a position control precision and an operating speed of the focus moving unit on the basis of this relationship, so that focusing can be carried out at a high speed and with high precision.

In a focusing operation, for example, a change in focus magnification at an image-pickup side caused by, for example, mounting converter lenses, a change in an image size at an image-pickup element caused by applying the image-pickup element to a lens-replacement-type image pickup device, and a change in an image pickup range due to a difference between aspect ratios may occur. Therefore, a change may occur in the relationship between the image pickup side and the focus detection side, as a result of which a proper focusing operation cannot be carried out.

Factors, such as a change in the relationship between a focus change amount and a unit operation amount of the focus moving unit (which results from a magnification change) make it difficult to properly set a position control precision and an operating speed of the focus moving unit, thereby preventing focusing from being carried out at high speed and with high precision.

Further, for example, a user may want to give priority to a T-number at the image pickup side than to focusing precision when shooting a dark object, or to give priority to following of a focus at high speed with respect to a moving object when shooting the moving body, or to give priority to focusing precision than to focusing speed when shooting a stationary object. In such cases, depending upon shooting conditions, whether the focusing precision, the focusing speed, or the T-number at the image-pickup side is to be given priority changes frequently, thereby preventing proper focusing characteristics from being obtained for the respective shooting conditions.

SUMMARY OF THE INVENTION

The present invention provides a lens apparatus which is suitable for a film camera and a video/broadcasting camera and which can perform a focusing operation at high speed and with high precision.

According to a first aspect of the prevent invention, there is provided a focusing optical system comprising at least one branching optical system disposed in a light path at the image side of a focus moving unit, a focusing detector that detects a focusing state using light beams from the branching optical system, a driving unit that drives the focus moving unit, and an operational circuit that outputs a drive signal to the driving unit on the basis of an output from the focusing detector. The focusing optical system performs focusing as a result of controlling the driving of the focus moving unit on the basis of a signal from the operational circuit. In the focusing optical system, it is possible to vary or switch the size that can be occupied by a focus detection area in the focusing detector within a predetermined range.

According to another aspect of the present invention, there is provided another focusing optical system comprising at least one branching optical system disposed in a light path at the image side of a focus moving unit, a focusing detector that detects a focusing state using light beams from the branching optical system, a driving unit that drives the focus moving unit, and an operational circuit that outputs a drive signal to the driving unit on the basis of an output from the focusing detector. The focusing optical system performs focusing as a result of controlling the driving of the focus moving unit on the basis of a signal from the operational circuit. In the focusing optical system, it is possible to vary or switch the amount of driving of the focus moving unit with respect to a signal from the focusing detector.

According to still another aspect of the present invention, there is provided still another focusing optical system comprising at least one branching optical system disposed in a light path at the image side of a focus moving unit, a focusing detector that detects a focusing state using light beams from the branching optical system, a driving unit that drives the focus moving unit, and an operational circuit that outputs a drive signal to the driving unit on the basis of an output from the focusing detector. The focusing optical system performs focusing as a result of controlling the driving of the focus moving unit on the basis of a signal from the operational circuit. In the focusing optical system, it is possible to vary or switch the precision with which the focusing detector detects the focusing state.

Further features of the present invention will become apparent from the following description of exemplary embodiments with reference to the attached drawings.

DESCRIPTION OF THE EMBODIMENTS

Exemplary embodiments of the present invention will be described below with reference to the drawings.

Figure 1:
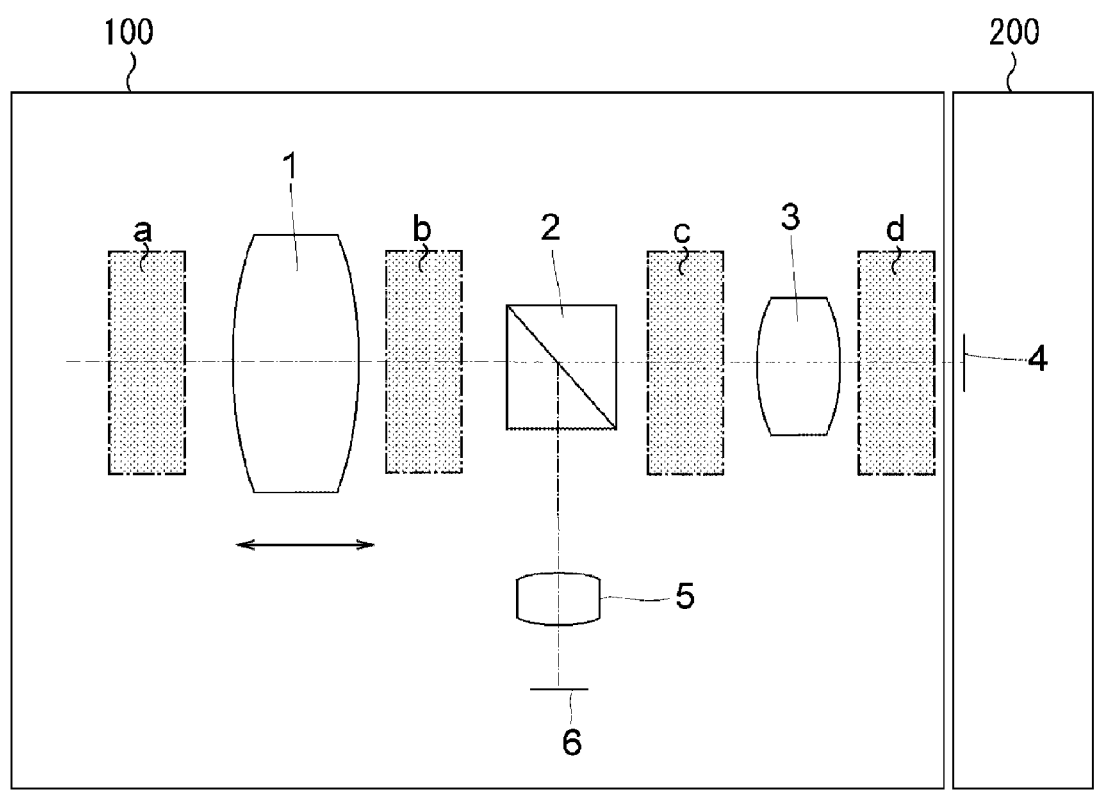
FIG. 1 shows a focusing optical system.

FIG. 1 is used to describe a lens apparatus prior to describing the exemplary embodiments. In FIG. 1, in a lens apparatus 100, a branching optical system 2, which is disposed behind a focus moving unit 1, and an image-pickup-side-portion optical system 3 are successively disposed. A camera body 200 comprises an image-pickup element 4, such as a CCD or a CMOS device, that picks up an image formed by the lens apparatus 100. In a direction in which the branching optical system 2 of the lens apparatus 100 divides light into the form of branches, a focus-detection-side-portion optical system 5 and a focus-state detecting element 6 are disposed. Symbols a to d denote positions where magnification-changing optical systems can be inserted. A focusing magnification $\beta F$ of the focus moving unit 1, a focusing magnification $\beta L$ of the image-pickup-side-portion optical system 3, a focusing magnification $\beta 5$ of the focus-detection-side-portion optical system 5, a focusing magnification $\beta P$ at the image-pickup side, and a focusing magnification $\beta D$ at the detection side have the following relationships of Expressions (1) and (2):

$$\beta P = \beta F \cdot \beta L \tag{1}$$

$$\beta D = \beta F \cdot \beta 5 \tag{2}$$

Therefore, a focusing magnification ratio $R\beta$ of the focusing magnification at the detection side with respect to that at the image-pickup side is given by the following Expression (3), and is set by the portion optical system following the branching optical system 2:

$$R\beta = \beta D / \beta P = \beta 5 / \beta L \tag{3}$$

When there is an out-of-focus amount $\Delta sP$ at the image-pickup side, an out-of-focus amount $\Delta sD$ at the detection side is proportional to the square of the focusing magnification ratio $R\beta$, and is given by the following Expression (4):

$$\Delta sD = \Delta sP \cdot R\beta 2 \tag{4}$$

Therefore, if the focusing magnification ratio $R\beta$ is known, measuring the out-of-focus amount $\Delta sD$ at the detection side makes it possible to determine the out-of-focus amount $\Delta sP$.

When a focus change amount at the image-pickup side with respect to a unit movement amount of the focus moving unit 1 is $\Delta FP$, and a focus change amount at the detection side is $\Delta FD$, the focus change amount $\Delta FD$ is given by Expression (5), and a movement amount $\Delta XDe$ of the focus moving unit 1 required for a focusing operation is given by Expression (6):

$$\Delta FD = \Delta FP \cdot R\beta 2 \tag{5}$$

$$\Delta XDe = -\Delta sD / \Delta FD \tag{6}$$

Accordingly, measuring the out-of-focus amount $\Delta sD$ at the detection side makes it possible to perform a focusing operation at high speed and with high precision as a result of controlling focusing on the basis of Expression (6).

Next, when an image-pickup range (image size) in a diagonal direction of the image-pickup element 4 is S0, and a range that can be occupied by a focus detection area in a diagonal direction of the focus-state detector 6 is A0, a ratio RD of a focusing detectable range with respect to the image size S0 is given by the following Expression (7):

$$RD = (A0/S0) \cdot R\beta \tag{7}$$

Here, it is desirable that the ratio RD satisfy the following Expression (8):

$$3 < RD < 1.1 \tag{8}$$

When the ratio RD exceeds the upper limit in Expression (8), the range that can be occupied by the focus detection area lies outside a screen, thereby preventing a focusing operation from being properly carried out. When the ratio RD becomes less than the lower limit in Expression (8), the range that can be occupied by the focus detection area at the screen is limited, thereby hindering proper framing.

In FIG. 1, in the case in which the magnification-changing mechanisms in the respective positions a to d optically change magnification by, for example, converter lenses, when change magnifications at the positions a to d are $\beta a$, $\beta b$, $\beta c$, and $\beta d$, respectively, Expressions (1), (2), and (3) become Expressions (9), (10), and (11), respectively:

$$\beta P' = \beta a \cdot \beta F \cdot \beta b \cdot \beta c \cdot \beta L \cdot \beta d \tag{9}$$

$$\beta D' = \beta a \cdot \beta F \cdot \beta b \cdot \beta 5 \tag{10}$$

$$R\beta' = \beta D'/\beta' = R\beta/(\beta c \cdot \beta d) \tag{11}$$

That is, when magnifications are optically changed at the positions c and d that are closer to an image side than the branching optical system, the RD ratio in Expression (7) becomes different from that before changing the magnifications. Therefore, the size of a range A that can be occupied by the focus detection area at the screen is considerably changed.

The focus change amount $\Delta FD$ at the detection side changes due the focusing magnification of the portion optical system that is disposed closer to the focus-state detecting element 6 than the focus moving unit 1, and is given by the following Expression (28):

$$\Delta FD' = \Delta FD \cdot \beta b2 \tag{28}$$

Therefore, a driving amount $\Delta XDr'$ is given by the following Expression (29):

$$\Delta XDr' = 1/\Delta FD' = \Delta XDr/\beta b2 \tag{29}$$

When the magnification is optically changed at the position b, the driving amount $\Delta XDr'$ is such that the driving amount $\Delta XDe$ in Expression (6) becomes different from that before changing the magnification.

Figure 2:
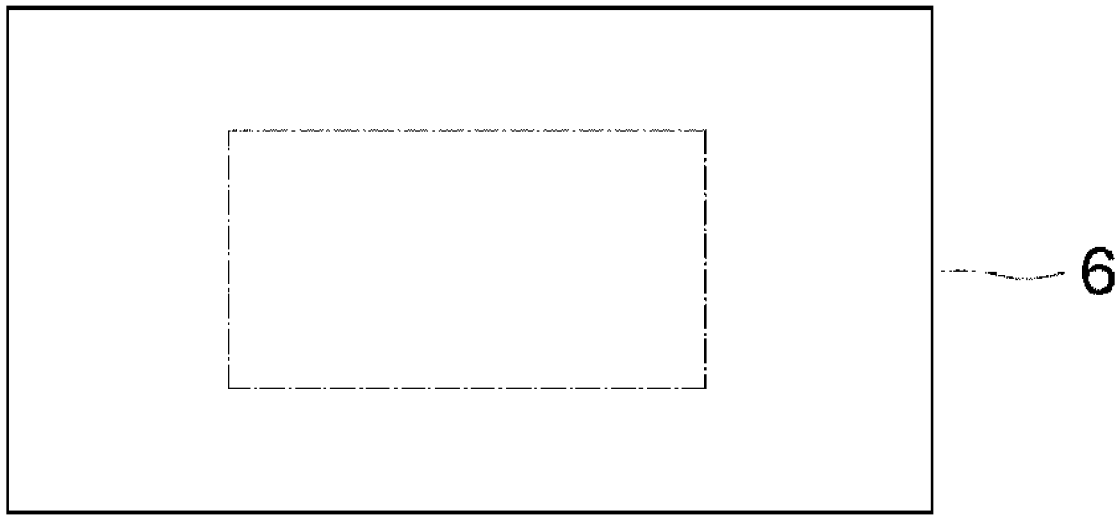
FIG. 2 shows an exemplary disposition of a focus detection area of a focusing detecting element.
Figure 3:
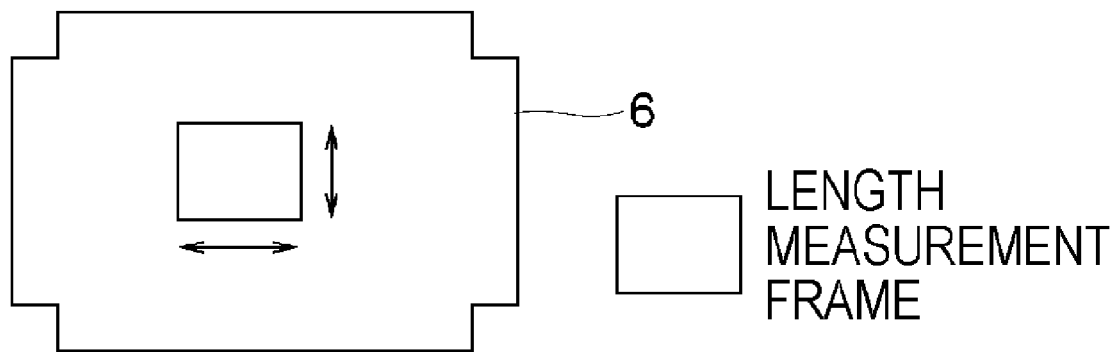
FIG. 3 shows another exemplary disposition of the focus detection area of the focusing detecting element.
Figure 4:
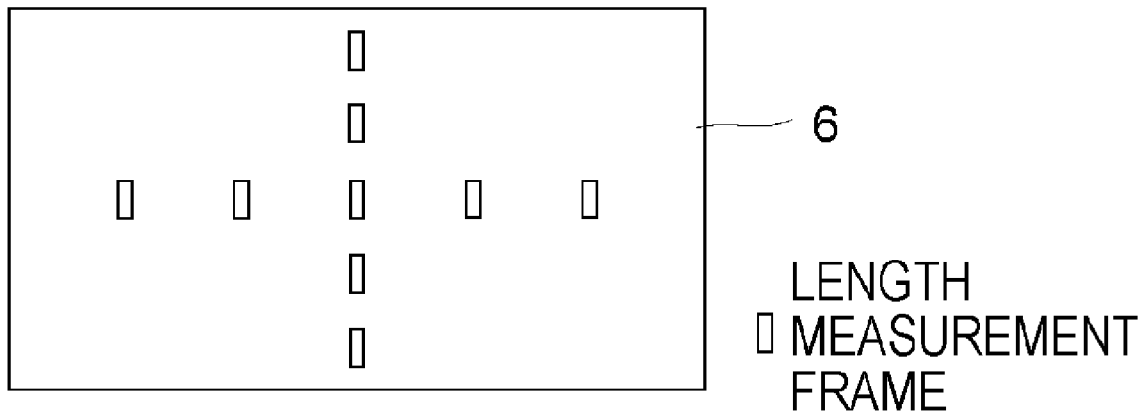
FIG. 4 shows still another exemplary disposition of the focus detection area of the focusing detecting element.
Figure 5:
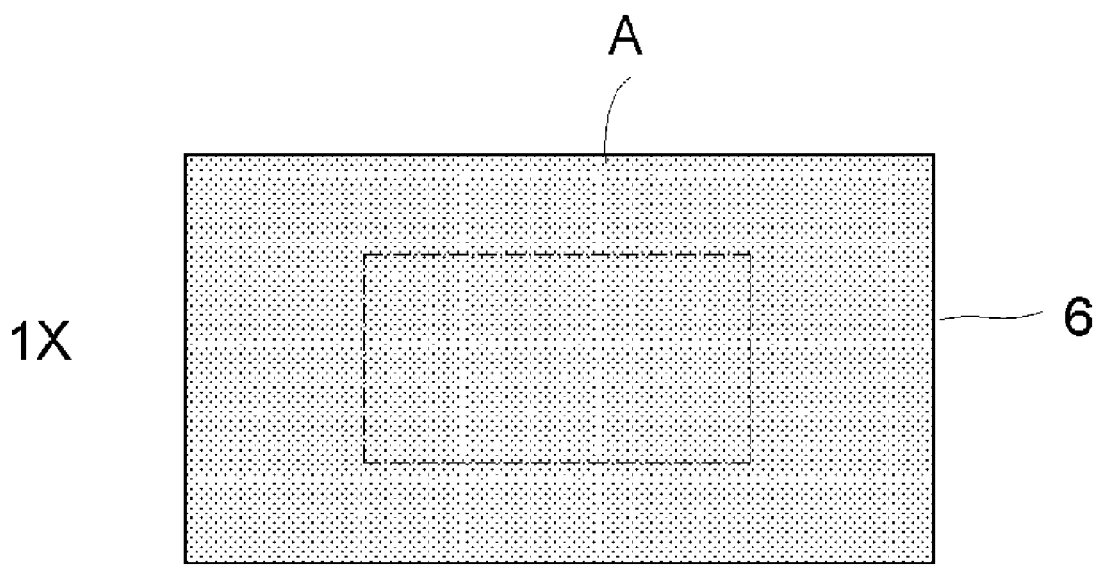
FIG. 5 shows still another exemplary disposition of the focus detection area of the focusing detecting element.
Figure 6:
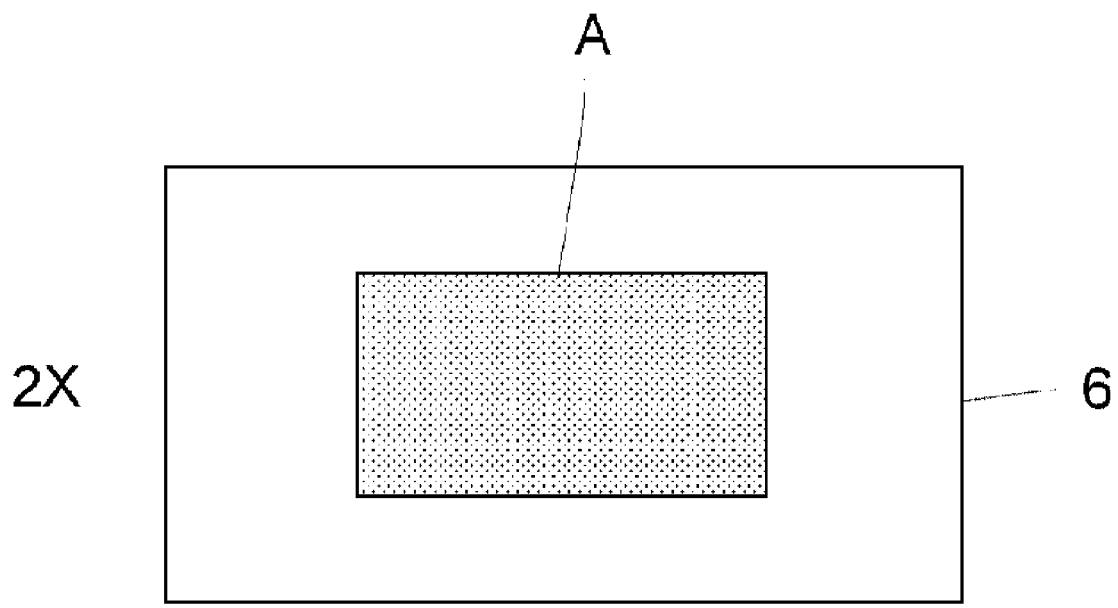
FIG. 6 shows still another exemplary disposition of the focus detection area of the focusing detecting element.
Figure 7:
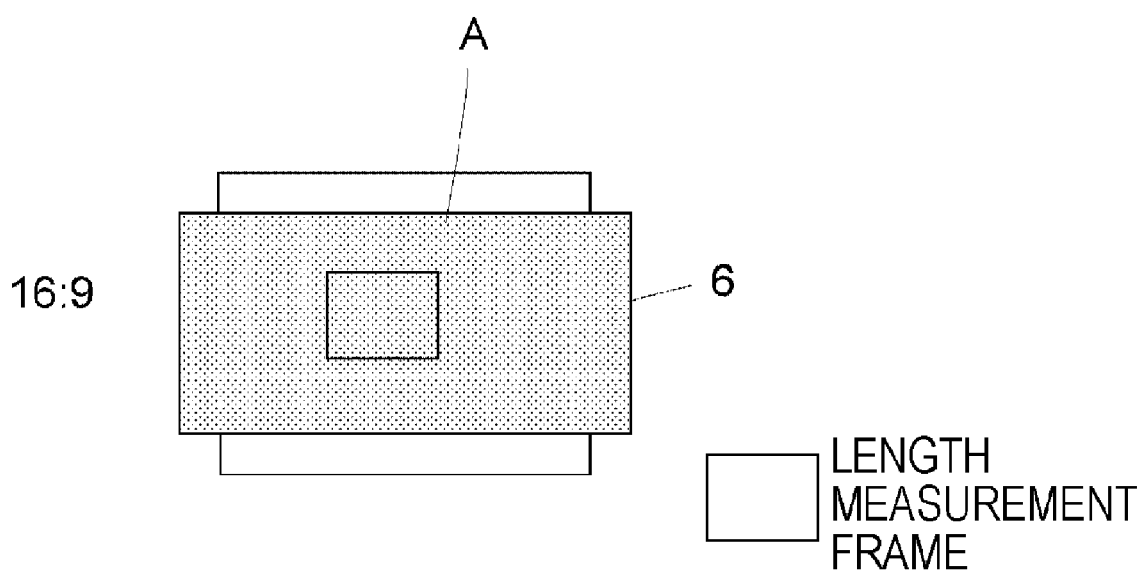
FIG. 7 shows still another exemplary disposition of the focus detection area of the focusing detecting element.
Figure 8:
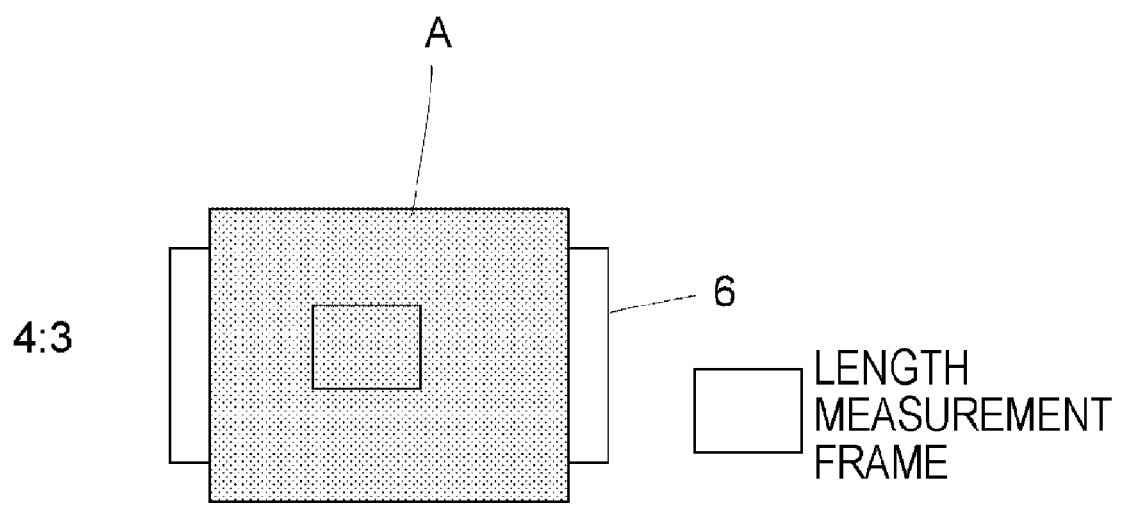
FIG. 8 shows still another exemplary disposition of the focus detection area of the focusing detecting element.
Figure 9:
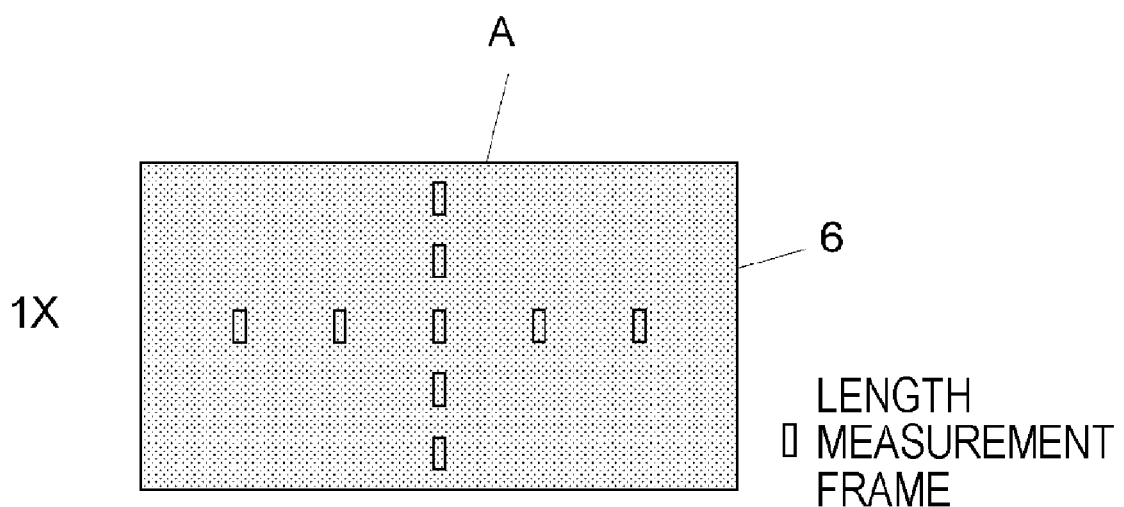
FIG. 9 shows still another exemplary disposition of the focus detection area of the focusing detecting element.
Figure 10:
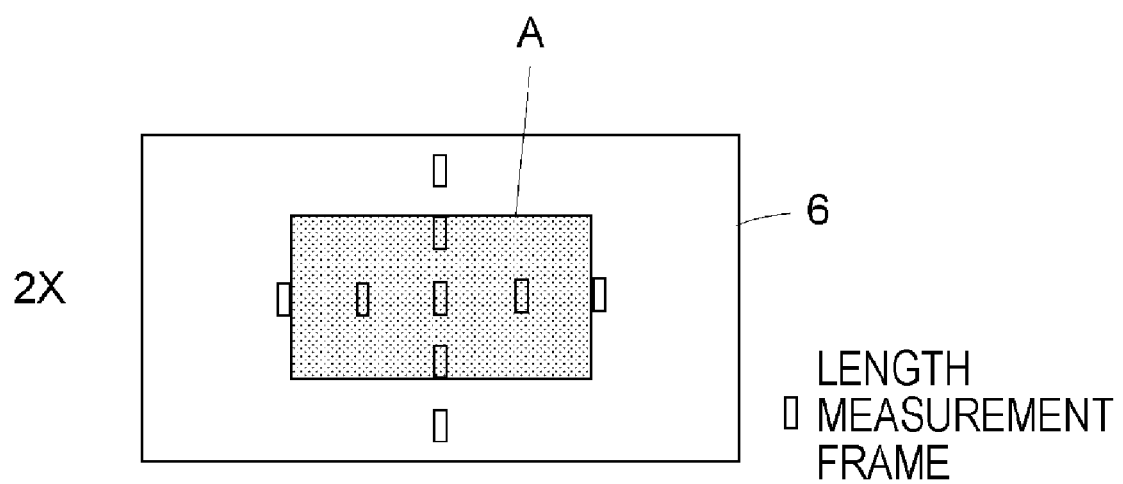
FIG. 10 shows still another exemplary disposition of the focus detection area of the focusing detecting element.

The focus detection area may be disposed by any of the following methods, that is, the method in which the entire range of the focus-state detecting element 6 is used as shown in FIG. 2, the method in which any range is successively moved and selected as shown in FIG. 3, and the method in which all or some discrete areas are selected as shown in FIG. 4. When the range A that can be occupied by the focus detection area is defined as shown in any one of FIGS. 5 to 10, the movement and selection of the focus detection area in the methods shown in FIGS. 5 to 10 are limited to the range A.

When the range A that can be occupied by the focus detection area is given by the length of an image plane at the focus-detection side, unless otherwise specified, the length is any one of a horizontal length, a vertical length, and a diagonal length of the screen, whereas, if specified, the horizontal length and vertical length are separately treated. The range A that can be occupied by the focus detection area may be arbitrarily set by a user or may be automatically switched by using a unit for detecting magnification change or mounting or insertion/removal of a magnification-changing unit.

First Embodiment

Figure 11:
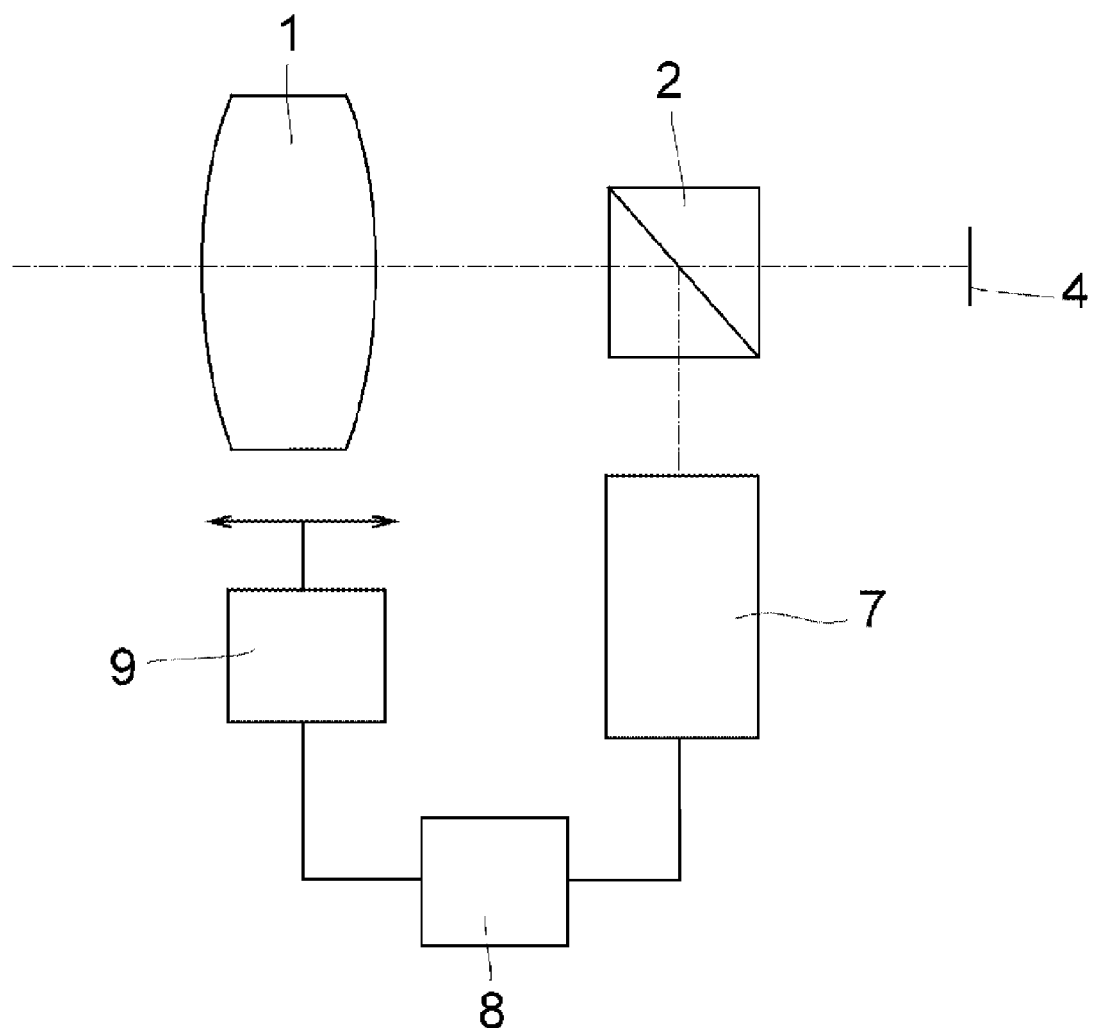
FIG. 11 shows a structure according to a first embodiment.

FIG. 11 shows a structure according to a first embodiment. In the structure, a branching optical system 2 (comprising, for example, a half-silvered mirror) and an image-pickup element 4 are disposed behind a moveable focus moving unit 1, and a focus-state detection circuit 7 (incorporating a focus-state detecting element 6) is disposed in the direction in which the branching optical system 2 divides light into the form of branches. In addition, an output of the focus-state detection circuit 7 is connected to an operational circuit 8, and an output of the operational circuit 8 is connected to a driving unit 9 including an actuator, so as to allow driving of the focus moving unit 1. Here, it is possible to vary a range A that can be occupied by a focus detection area of the focus-state detection circuit 7. In addition, it is possible to vary a driving amount $\Delta XDr$ of the focus moving unit 1, which is set by the driving unit 9, with respect to a detection value from the focus-state detection circuit 7.

Figure 12:
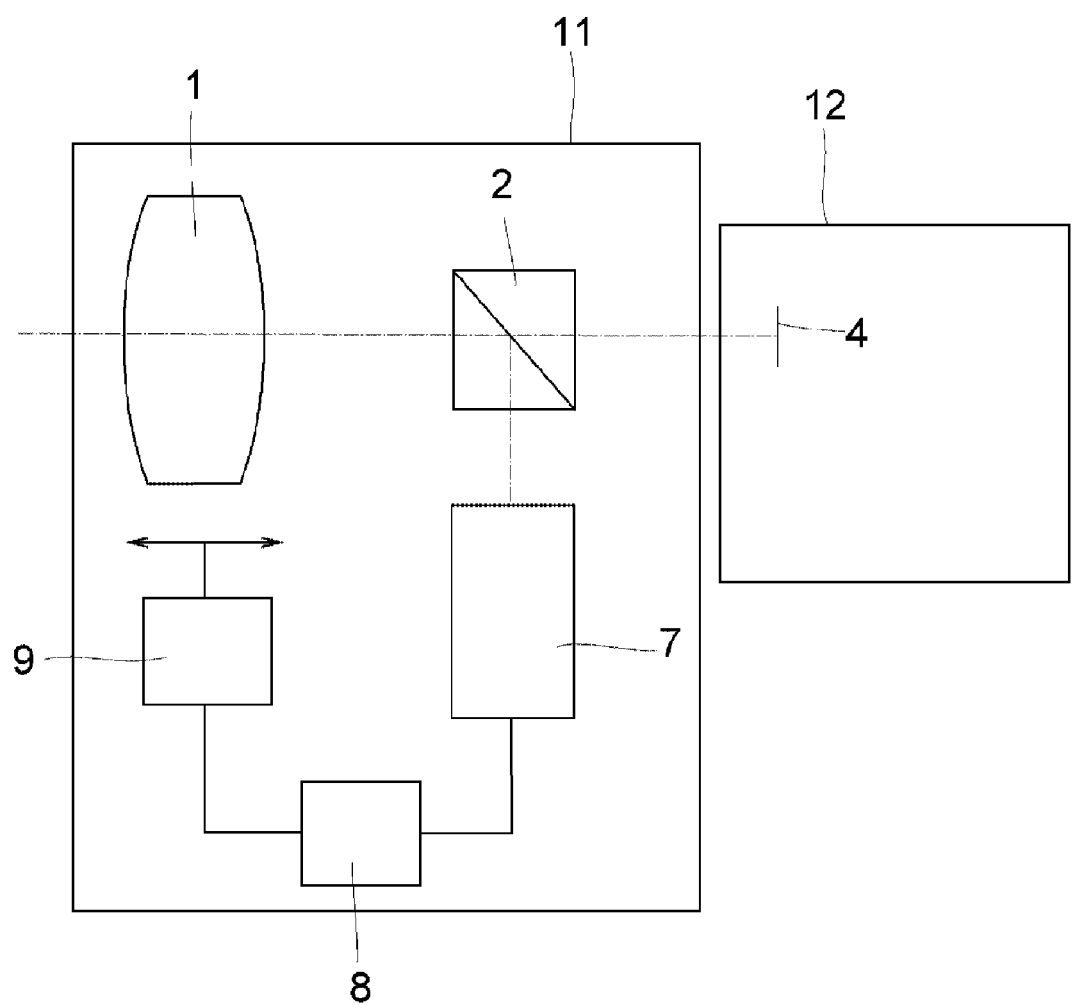
FIG. 12 shows a structure of a camera system including the structure according to the first embodiment.

As shown in FIG. 12, a camera system comprises a lens apparatus 11 and a camera body 12. The lens apparatus 11 comprises the focus moving unit 1, the branching optical system 2, the focus-state detection circuit 7, the operational circuit 8, and the driving unit 9. The camera body 12 comprises the image-pickup element 4 and has the lens apparatus 11 mounted on it.

Second Embodiment

Figure 13:
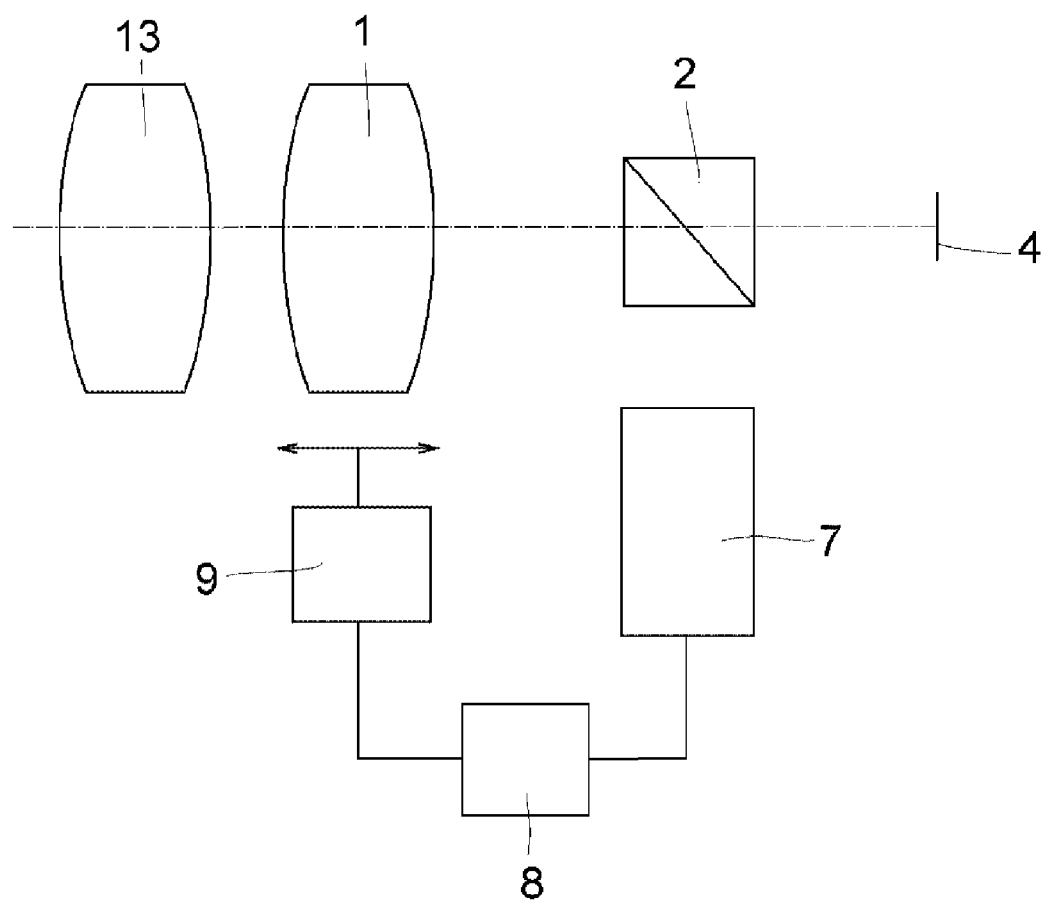
FIG. 13 shows a structure according to a second embodiment.

FIG. 13 shows a structure according to a second embodiment. The structure according to the second embodiment comprises the components according to the first embodiment and a focal-length-changing optical system 13 adjacent or mounted on the focus moving unit 1. The focal-length-changing optical system 13 corresponds to the magnification-changing optical system that changes magnification at the position a in FIG. 1, and FNo of the focus moving unit and a focusing magnification ratio $R\beta$ are the same. Therefore, a focus detection precision PDe is the same.

Ratios RD' before and after the focal-length-changing optical system 13 is attached do not differ from Expression (11), so that a range A is the same. A focus change amount $\Delta FD'$ does not differ from that given by Expression (28), so that a driving amount $\Delta XDr$ of the focus moving unit 1 is the same.

Third Embodiment

Figure 14:
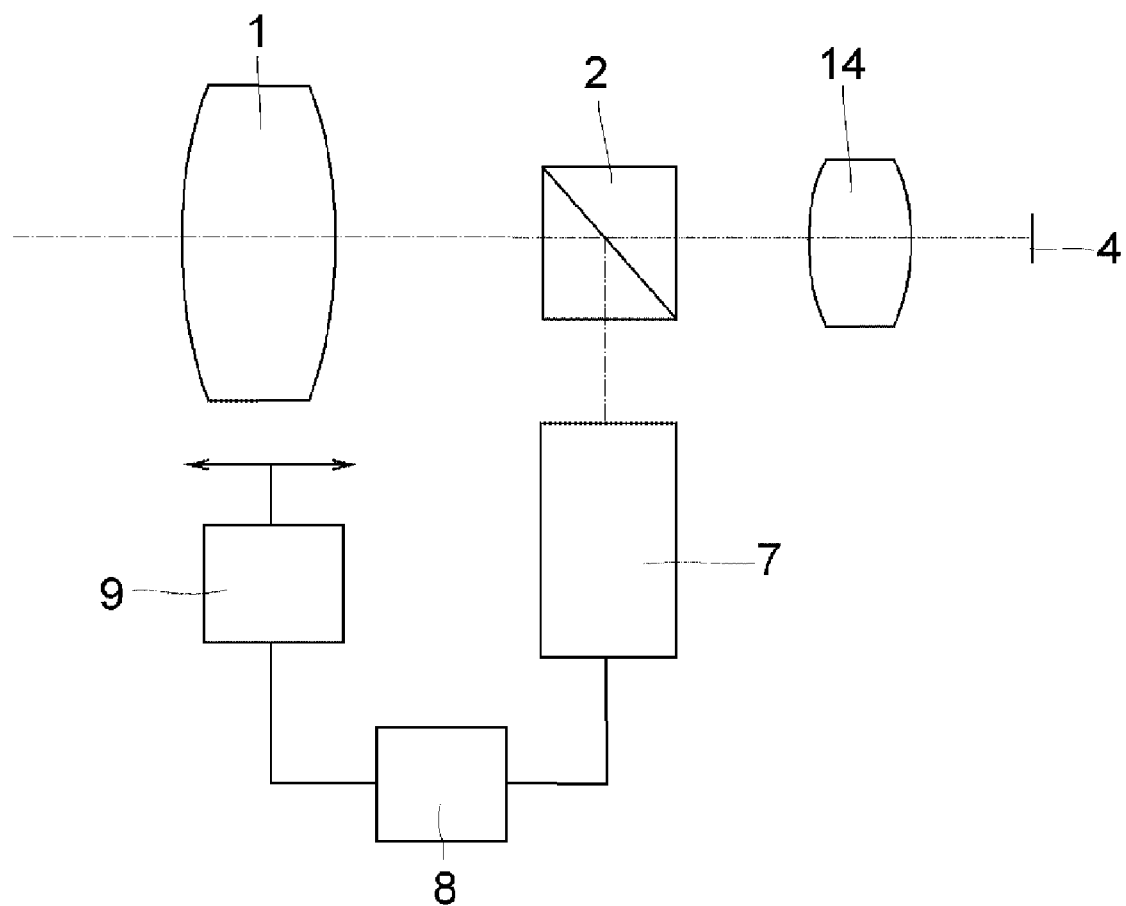
FIG. 14 shows a structure according to a third embodiment.

FIG. 14 shows a structure according to a third embodiment. The structure according to the third embodiment comprises the components according to the first embodiment and has a focal-length-changing optical system 14 mounted in a light path between the branching optical system 2 and the image-pickup element 4. The focal-length-changing optical system 14 corresponds to the magnification-changing optical system that changes magnification at the position d in FIG. 1. When a focal-length change magnification of the focal-length-changing optical system 14 is $\beta 14$, a ratio RD14 that is set when the focal-length-changing optical system 14 is mounted is given by the following Expression (12), as a result of which a focus detectable range on a screen becomes different from that prior to the mounting.

$$RD14 = (A0/S0) \cdot R\beta/14 = RD/\beta 14 \tag{12}$$

The focal-length change magnification $\beta 14$ is, for example, 1.4. By switching a range that can be occupied by a focus detection area to A1, $RD14 \cong RD$. Here, to maintain the range A1 that can be occupied by the focus detection area on the screen before mounting the focal-length-changing optical system 14 substantially equal to that after mounting the focal-length-changing optical system 14, it is desirable that the following Expression (13) be satisfied:

$$0.9 < \beta 14 \cdot A1/A0 < 1.1 \tag{13}$$

A focus change amount $\Delta FD'$ does not differ from that of Expression (28), so that the driving amount $\Delta XDr$ of the focus moving unit 1 is the same.

When the focal-length-changing optical system 14 is attached, the Expression used to determine the ratio RD14 of a focus detectable range with respect to an image pickup range S changes from Expression (12) to Expression (42). Since the focus detectable range at the screen is different from that prior to the mounting, A1 is given by Expression (43) in the second embodiment:

$$RD14 = RD/\beta 14 = 0.71 \cdot RD \tag{42}$$

$$A1 = 0.7 \cdot A0 \tag{43}$$

Accordingly, by setting the values of Expression (13) as in the following Expression (44) so that the focus detectable range is switched to A1, it is possible to maintain the focus detectable range before mounting the focal-length-changing optical system 14 substantially equal to that after mounting the focal-length-changing optical system 14:

$$\beta 14 \cdot A1/A0 = 0.98 \tag{44}$$

Fourth Embodiment

Figure 15:
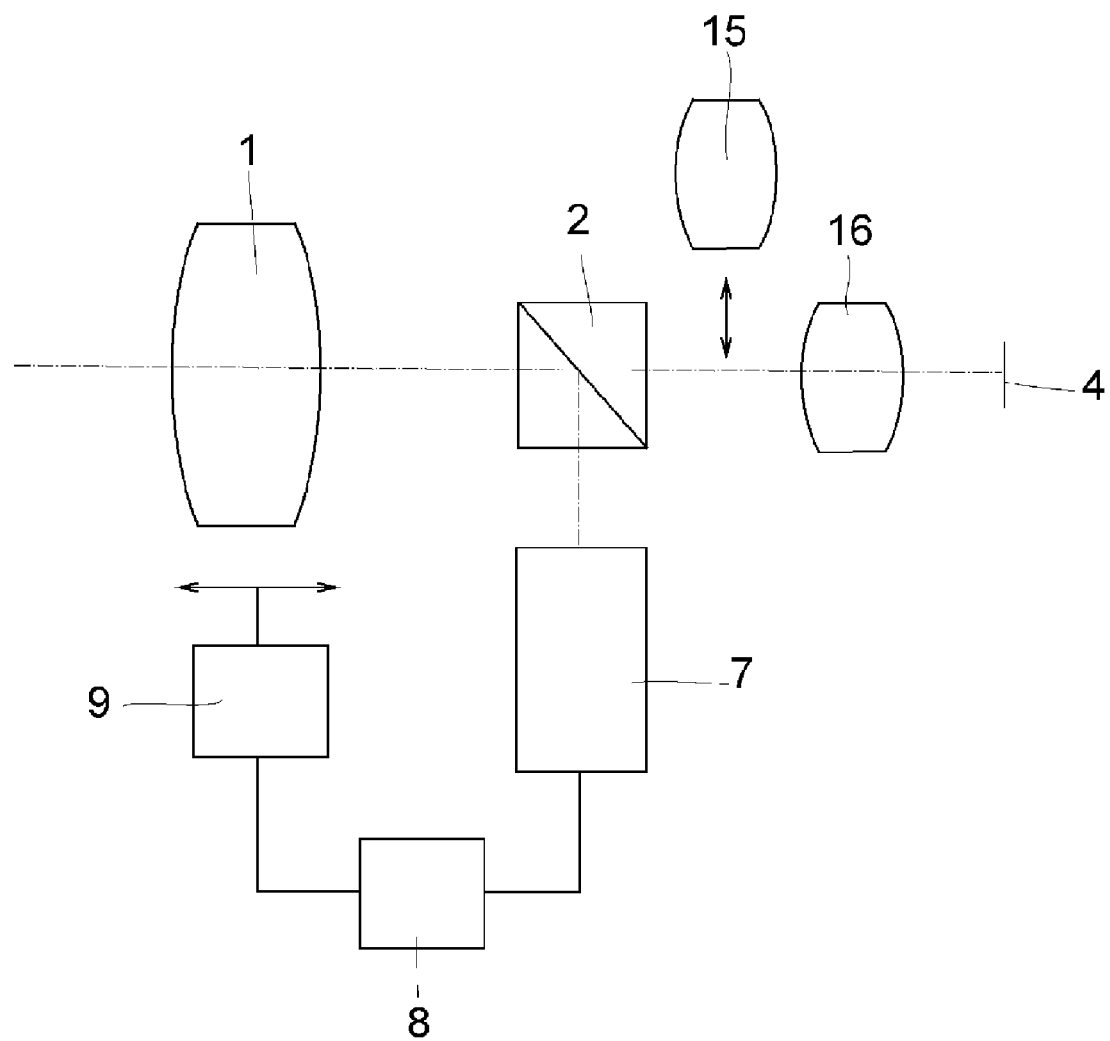
FIG. 15 shows a structure according to a fourth embodiment.

FIG. 15 shows a structure according to a fourth embodiment. The structure according to the fourth embodiment comprises the components according to the first embodiment and has an insertable-and-removable focal-length-changing optical system 15 and a relay lens unit 16 inserted in a light path between the branching optical system 2 and the image-pickup element 4. The focal-length-changing optical system 15 corresponds to the magnification-changing optical system that changes magnification at the position c in FIG. 1. When a focal-length change magnification of the focal-length-changing optical system 15 is β15, a ratio RD that is set when the focal-length-changing optical system 15 is inserted is given by the following Expression (14), as a result of which a range that can be occupied by a focus detection area at a screen becomes different from that prior to the mounting.

$$RD15=(A0/S0)\cdot R\beta/\beta14=RD/\beta15 \tag{14}$$

By switching the range that can be occupied by the focus detection area to A2, RD15≅RD. Here, to maintain the range A2 that can be occupied by the focus detection area on the screen before inserting the focal-length-changing optical system 15 substantially equal to that after inserting the focal-length-changing optical system 15, it is desirable that the following Expression (15) be satisfied:

$$0.9<\beta15\cdot A2/A0<1.1 \tag{15}$$

In the fourth embodiment, the focal-length change magnification β15 of the focal-length-changing optical system 15 is 2.0. When the focal-length-changing optical system 15 is inserted, the Expression used to determine the ratio RD15 of a focus detectable range with respect to an image pickup range changes from Expression (14) to Expression (45). Since the focus detectable range at the screen changes—i.e. is different from that prior to the mounting, A2 is given by Expression (46) in the fourth embodiment:

$$RD15=RD/\beta15=0.5\cdot RD \tag{45}$$

$$A2=0.5\cdot A0 \tag{46}$$

Accordingly, by setting the values of Expression (15) as in the following Expression (47) so that the focus detectable range is switched to A1, it is possible to maintain the focus detectable range before inserting the focal-length-changing optical system 15 substantially equal to that after mounting the focal-length-changing optical system 15:

$$\beta15\cdot A2/A0=1.0 \tag{47}$$

Driving amounts ΔXDr before and after the insertion or removal of the focal-length-changing optical system 15 are the same.

Fifth Embodiment

Figure 16:
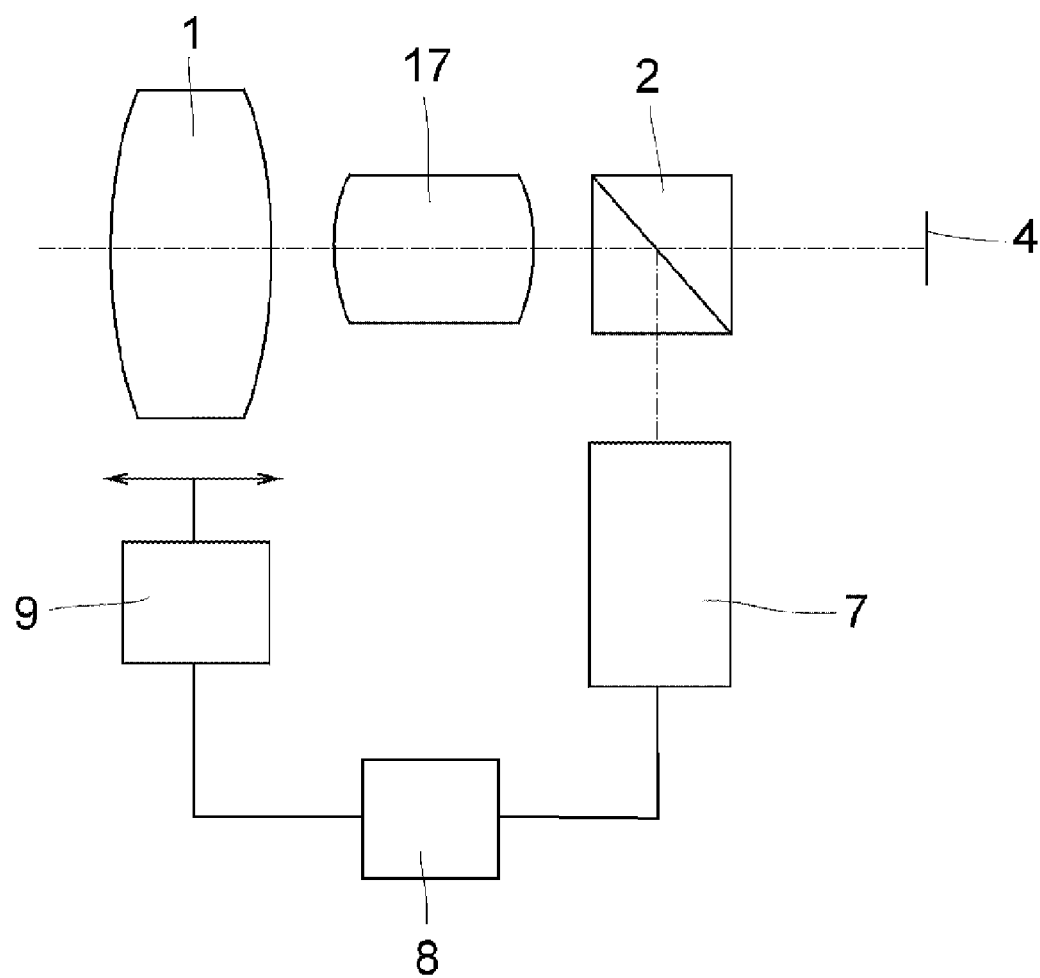
FIG. 16 shows a structure according to a fifth embodiment.

FIG. 16 shows a structure according to a fifth embodiment. The structure according to the fifth embodiment comprises the components according to the first embodiment and has a magnification-changing-and-moving unit 17 inserted between the branching optical system 2 and the focus moving unit 1. The magnification-changing-and-moving unit 17 corresponds to the magnification-changing optical system that changes magnification at the position b in FIG. 1. A ratio RD' does not differ from that given by Expression (11), and a range A is the same.

When a magnification change ratio of the magnification-changing-and-moving unit 17 is β17, a driving amount ΔXDr is given by the following Expression (30), causing a focus driving amount per detection value to become different from that prior to changing magnification:

$$\Delta XDr17=\Delta XDr/\beta172 \tag{30}$$

Since ΔXDr17 is set to a variable value ΔXDr17(17), to maintain focus controlling operations substantially the same, it is desirable that the following Expression (31) be satisfied:

$$0.8<\beta172\cdot\Delta XDr17(17)/\Delta XDr<1.2 \tag{31}$$

In the fifth embodiment, a magnification changeable range of the magnification-changing-and-moving unit 17 is given by the following Expression (48):

$$1.0<\beta17<2.0 \tag{48}$$

As the magnification is changed by the magnification-changing-and-moving unit 17, a focus change amount ΔFD changes in accordance with Expression (28), and the driving amount ΔXDr17 of the focus moving unit 1 is given by the following Expression (49) ("~" stands for "from," and is used with this meaning in some of the other expressions):

$$\Delta XDr17=1.0\cdot\Delta XDr\sim0.25\cdot\Delta XDr \tag{49}$$

Therefore, by setting the values of Expression (31) as in the following Expression (50) so that the driving amount ΔXDr17 (17) is variable, substantially the same focus controlling operations can be carried out before and after changing the magnification by the magnification-changing-and-moving unit 17:

$$\beta172\cdot\Delta XDr17(17)=1.0 \tag{50}$$

Sixth Embodiment

Figure 17:
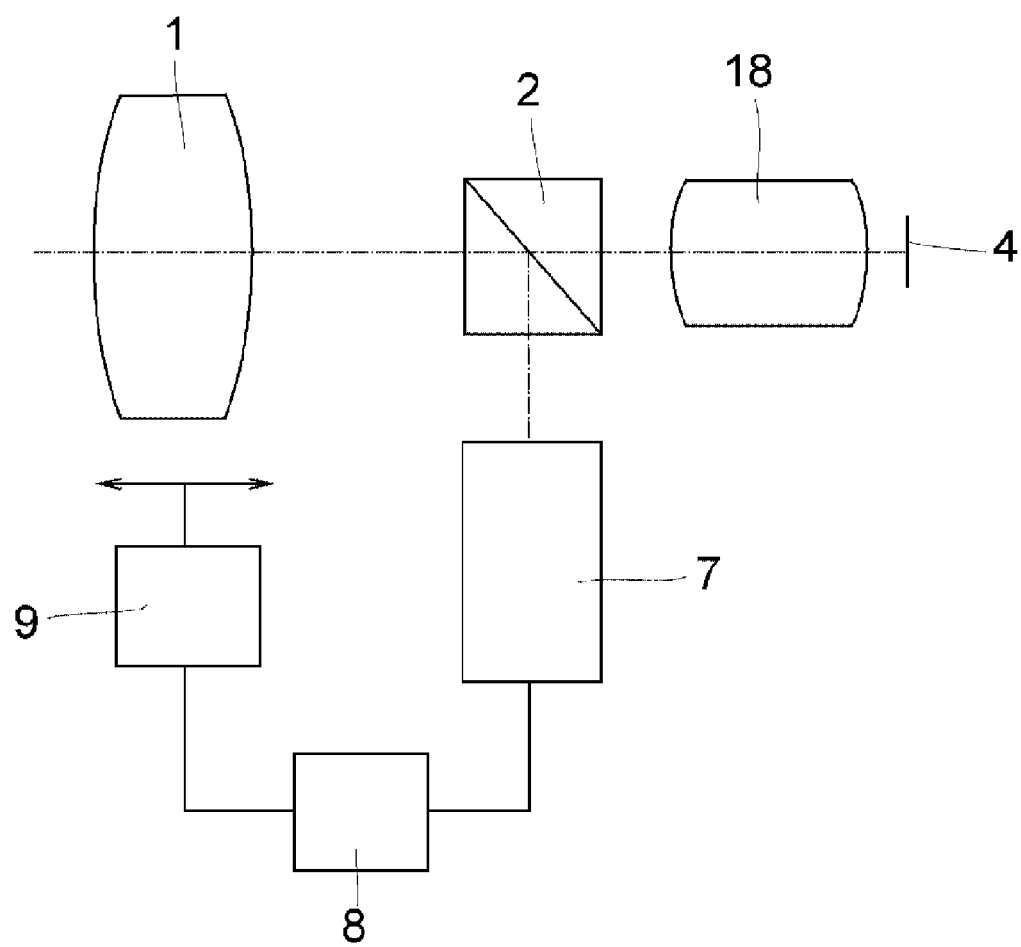
FIG. 17 shows a structure according to a sixth embodiment.

FIG. 17 shows a structure according to a sixth embodiment. The structure according to the sixth embodiment comprises the components according to the first embodiment shown in FIG. 11 and has a magnification-changing-and-moving unit 18 inserted between the branching optical system 2 and the image-pickup element 4. The magnification-changing-and-moving unit 18 corresponds to the magnification-changing optical system that changes magnification at the position c in FIG. 1. When a magnification change ratio of the magnification-changing-and-moving unit 18 is β18, a ratio RD is given by the following Expression (16), as a result of which a range that can be occupied by a focus detection area on a screen becomes different from that prior to changing magnification:

$$RD18=(A0/S0)\cdot R\beta/\beta18=RD/\beta18 \tag{16}$$

By setting the range that can be occupied by the focus detection area to a variable value A3 (18), RD18≅RD. Here, to maintain the range that can be occupied by the focus detection area on the screen at a substantially equal value, independently of a magnification-changing operation by the magnification-changing-and-moving unit 18, it is desirable that the following Expression (17) be satisfied:

$$0.9<\beta18\cdot A3(18)/A0<1.1 \tag{17}$$

A focus change amount ΔFD' does not differ from that of Expression (28), so that a driving amount ΔXDr of the focus moving unit 1 is the same.

A magnification changeable range of the magnification-changing-and-moving unit 18 is given by the following Expression (51):

$$1.0<\beta18<2.0 \tag{51}$$

Since the ratio RD is changed by the magnification change ratio β18, a range A is changed. Due to the magnification change ratio β18 of the magnification-changing-and-moving unit 18, the Expression used to determine the ratio RD18 of a focus detectable range with respect to an image pickup range S changes from Expression (16) to Expression (52). Since the focus detectable range at the screen is different from that prior to mounting the magnification-changing-and-moving unit 18, it is desirable that Expression (53) be satisfied in the sixth embodiment:

$$RD18 = RD/\beta18 = 1.0 \cdot RD \sim 0.5 \cdot RD \tag{52}$$

$$A3(18) = 1.0 \cdot A0 \sim 0.5 \cdot A0 \tag{53}$$

By setting the values of Expression (17) as in the following Expression (54) so that the focus detectable range is made variable in accordance with A3 (18), the focus detectable range is maintained at substantially the same value, independently of a magnification-changing operation by the magnification-changing-and-moving unit 18:

$$\beta18 \cdot A2/A0 = 1.0 \tag{54}$$

Seventh Embodiment

Figure 18:
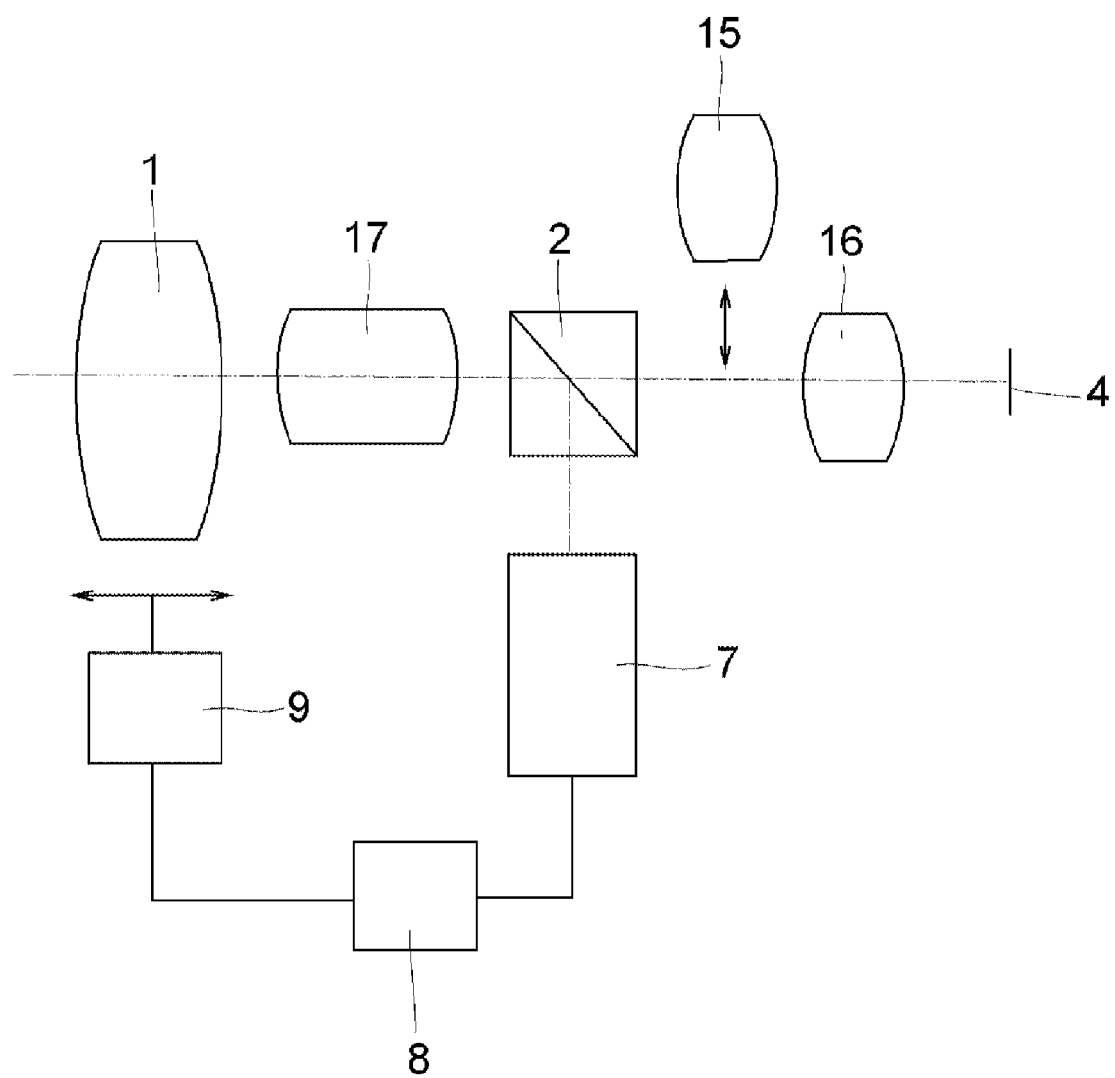
FIG. 18 shows a structure according to a seventh embodiment.

FIG. 18 shows a structure according to a seventh embodiment. The structure according to the seventh embodiment comprises the components according to the fourth embodiment shown in FIG. 15 and has a magnification-changing-and-moving unit 17 inserted in a light path between the branching optical system 2 and the focus moving unit 1 as in the fifth embodiment. A magnification changeable range of the magnification-changing-and-moving unit 17 satisfies the following Expression (55):

$$1.0 < \beta17 < 10.0 \tag{55}$$

Since the relationship of a focus detectable range with respect to an image pickup range S does not change regardless of a magnification-changing operation by the magnification-changing-and-moving unit 17, a range A does not change.

Since, as the magnification is changed by the magnification-changing-and-moving unit 17, a focus change amount ΔFD changes due to Expression (28), a driving amount ΔXDr' of the focus moving unit 1 in the seventh embodiment is given by the following Expression (70):

$$\Delta XDr17 = 1.0 \cdot \Delta XDr \sim 0.01 \cdot \Delta XDr \tag{70}$$

Therefore, by setting the values of Expression (31) as in the following Expression (71) so that a driving amount ΔXDr17 is made variable, substantially the same focus controlling operations can be carried out before and after changing the magnification by the magnification-changing-and-moving unit 17:

$$\beta172 \cdot \Delta XDr17(17) = 1.0 \tag{71}$$

In the seventh embodiment, the focal-length change magnification β15 of the focal-length-changing optical system 15 is 2.0. When the focal-length-changing optical system 15 is inserted, the Expression used to determine a ratio RD15 of a focus detectable range with respect to an image pickup range changes from Expression (14) to Expression (56), which is the same as Expression (45). Since a focus detectable range at the screen is different from that prior to the mounting, A2 is given by Expression (57), which is the same as Expression (46):

$$RD15 = RD/\beta15 = 0.5 \cdot RD \tag{56}$$

$$A2 = 0.5 \cdot A0 \tag{57}$$

Accordingly, by setting the values of Expression (15) as in the following Expression (58), which is the same as Expression (47), so that the focus detectable range is switched to A2, it is possible to maintain the focus detectable range before mounting the focal-length-changing optical system 15 substantially equal to that after mounting the focal-length-changing optical system 15:

$$\beta15 \cdot A2/A0 = 1.0 \tag{58}$$

Driving amounts ΔXDr before and after the mounting of the focal-length-changing optical system 15 are the same.

Eighth Embodiment

Figure 19:
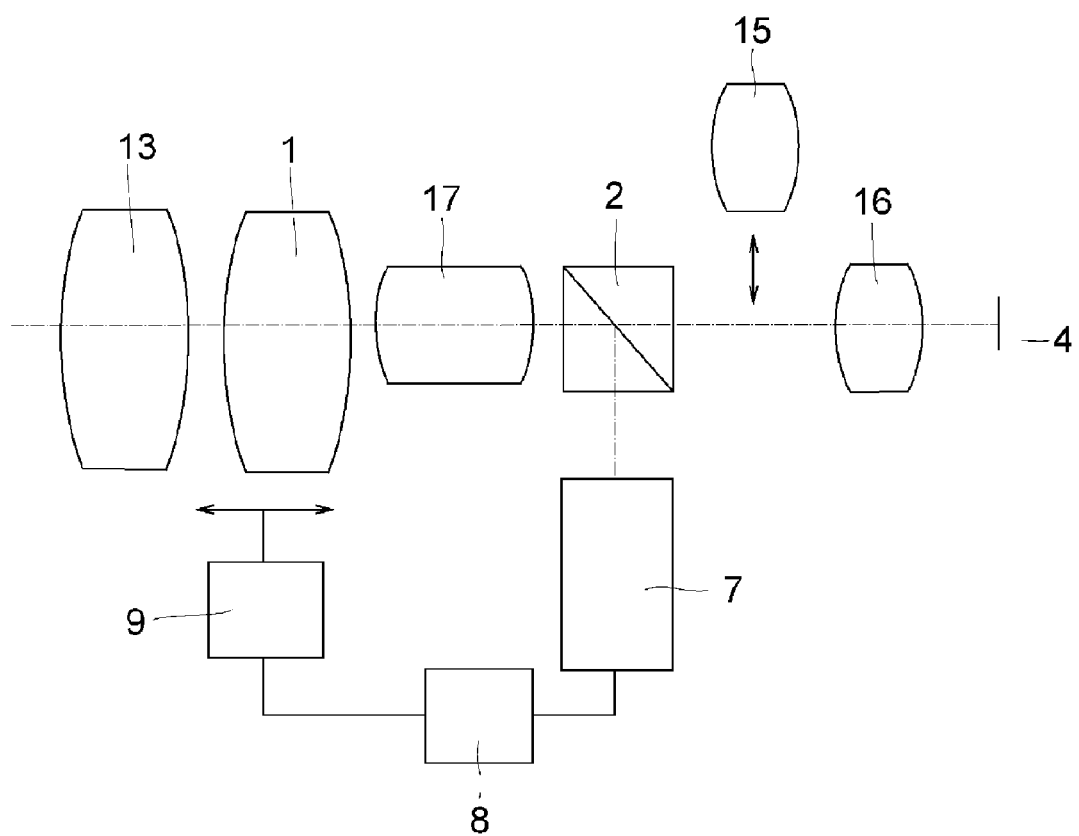
FIG. 19 shows a structure according to an eighth embodiment.

FIG. 19 shows a structure according to an eighth embodiment. The structure according to the eighth embodiment comprises the components according to the seventh embodiment shown in FIG. 18 and has a focal-length-changing optical system 13 mounted at an object side of the focus moving unit 1. A focal length change magnification β13 of the focal-length-changing optical system 13 is 0.8.

Since the relationships of a focus detectable range with respect to an image pickup range S are the same before and after the mounting of the focal-length-changing optical system 13, a range A is the same. In addition, a driving amount ΔXDr is the same.

Ninth Embodiment

Figure 20:
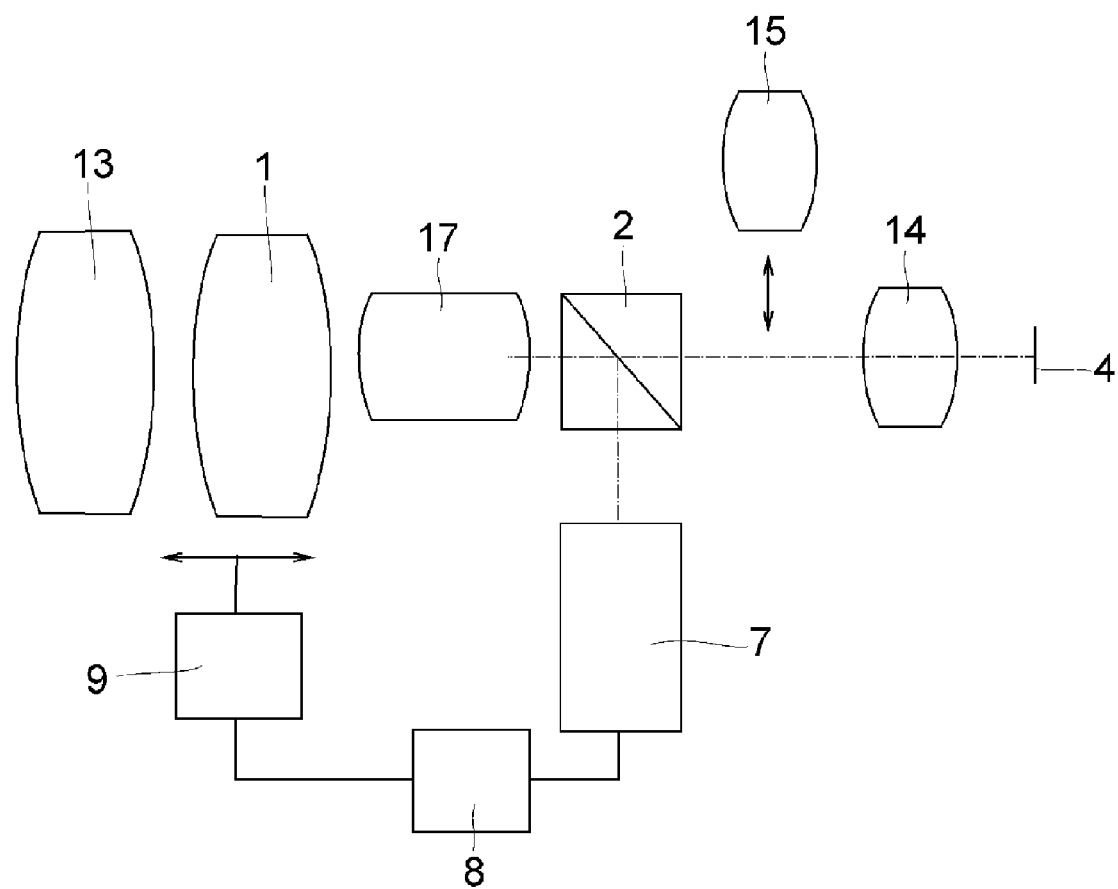
FIG. 20 shows a structure according to a ninth embodiment.

FIG. 20 shows a structure according to a ninth embodiment. The structure according to the ninth embodiment comprises the components according to the eighth embodiment shown in FIG. 19 excluding the relay lens unit 16, and has a focal-length-changing optical system 14 instead of the relay lens unit 16. A focal length change magnification β14 of the focal-length-changing optical system 14 is 1.4. When the focal-length-changing optical system 14 is mounted, the Expression used to determine a ratio RD14 of a focus detectable range with respect to an image pickup range S changes from Expression (12) to Expression (59). Since a focus detectable range at the screen changes with respect to that prior to the mounting, A1 is given by Expression (60) in the ninth embodiment:

$$RD14 = RD/\beta14 = 0.71 \cdot RD \tag{59}$$

$$A1 = 0.7 \cdot A0 \tag{60}$$

Accordingly, by setting the values of Expression (13) as in the following Expression (61) so that the focus detectable range is switched to A1, it is possible to maintain the focus detectable range before mounting the focal-length-changing optical system 14 substantially equal to that after mounting the focal-length-changing optical system 14:

$$\beta14 \cdot A1/A0 = 0.98 \tag{61}$$

Driving amounts ΔXDr before and after the mounting of the focal-length-changing optical system 14 are the same.

Tenth Embodiment

Figure 21:
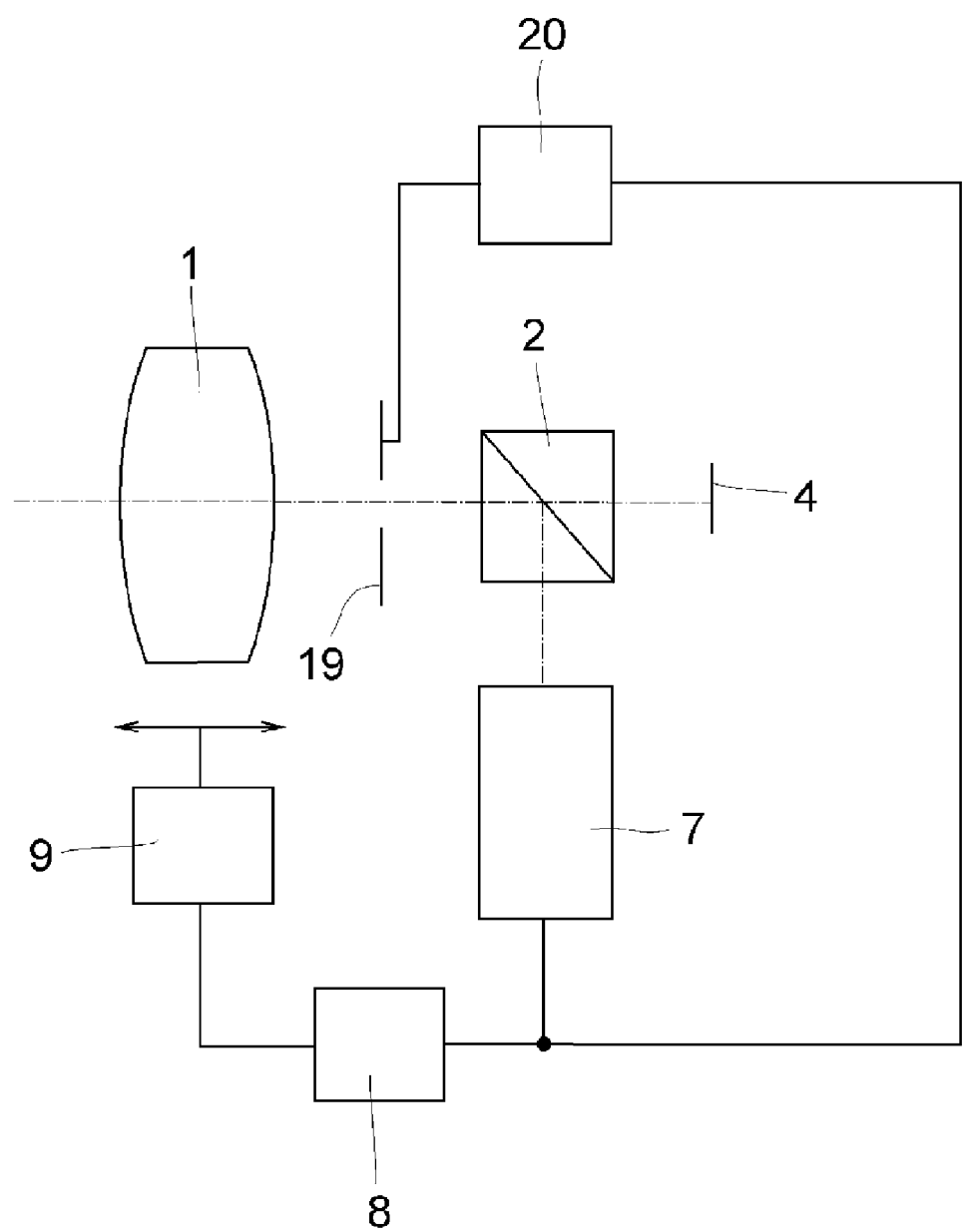
FIG. 21 shows a structure according to a tenth embodiment.

FIG. 21 shows a structure according to a tenth embodiment. The structure according to the tenth embodiment comprises the components according to the first embodiment, and a stop 19 and an F-number detector 20. The stop 19 is disposed between the focus moving unit 1 and the branching optical system 2. The F-number detector 20 detects the position of the stop 19. An output of the F-number detector 20 and an output of the focus-state detection circuit 7 are connected to the operational circuit 8. In the tenth embodiment, a range A that can be occupied by a focus detection area and the driving amount $\Delta XDr$ of the focus moving unit 1 with respect to a detection value from the focus-state detection circuit 7 are variable.

To increase the precision with which focusing is carried out, in general, it is necessary to set the signal-to-noise ratio (S/N) of a signal from the focus-state detection circuit 7 to a proper value for realizing a precise detecting operation. Therefore, it becomes necessary for an exposure amount used for the detecting operation to be large. Therefore, focusing speed is reduced, or a ratio between light quantities of branched light beams is required at a detection side, thereby reducing light quantity at an image pickup side.

To precisely carry out a focus controlling operation, it becomes necessary to reduce driving speed of the focus moving unit 1, thereby reducing focusing speed. When a minimum circle of confusion with respect to the image-pickup element 4 is $\delta$, and a diaphragm stop value (F number) of a focusing optical system is FNo, a focal depth d at the image pickup side is given by the following Expression (32):

$$d = 2 \cdot FNo \cdot \delta \tag{32}$$

The relationship between a required focusing precision P at the image pickup side and a focus detection precision PDe at the detection side is represented by the following Expression (33):

$$PDe = P \cdot R\beta 2 \tag{33}$$

When the focus precision P is set as a value that is proportional to the focal depth d, the focus detection precision PDe allows a proper focusing precision and a proper focusing speed to be achieved due to the following Expression (34):

$$PDe = CP \cdot d \cdot R\beta 2 \tag{34}$$
$$= CP \cdot 2 \cdot FNo \cdot \delta \cdot R\beta 2$$

Here, CP is a constant value, and desirably falls in the range of the following Expression (35):

$$0.1 < CP < 1.0 \tag{35}$$

In the tenth embodiment, FNo of the focusing optical system is detected by the F-number detector 20, and, in accordance with the detection value, the focus detection precision PDe is made variable or is switched. A change in the focus detection precision PDe is ideally based on Expression (34), but may be switched in accordance with an FNo range in a prepared table.

In the tenth embodiment, $\delta = 0.01$ mm and $R\beta = 1.0$. The constant value $CP = 0.25$, and is made to satisfy the condition in Expression (35), so that the focusing can be properly controlled. In addition, in the tenth embodiment, in accordance with the FNo detected by the F-number detector 20, the focus detection precision PDe of the focus-state detection circuit 7 is varied by the following Expression (62):

$$PDe = 0.005 \cdot FNo \tag{62}$$

This causes a proper focusing precision and a proper focusing speed to be achieved in accordance with FNo.

Eleventh Embodiment

Figure 22:
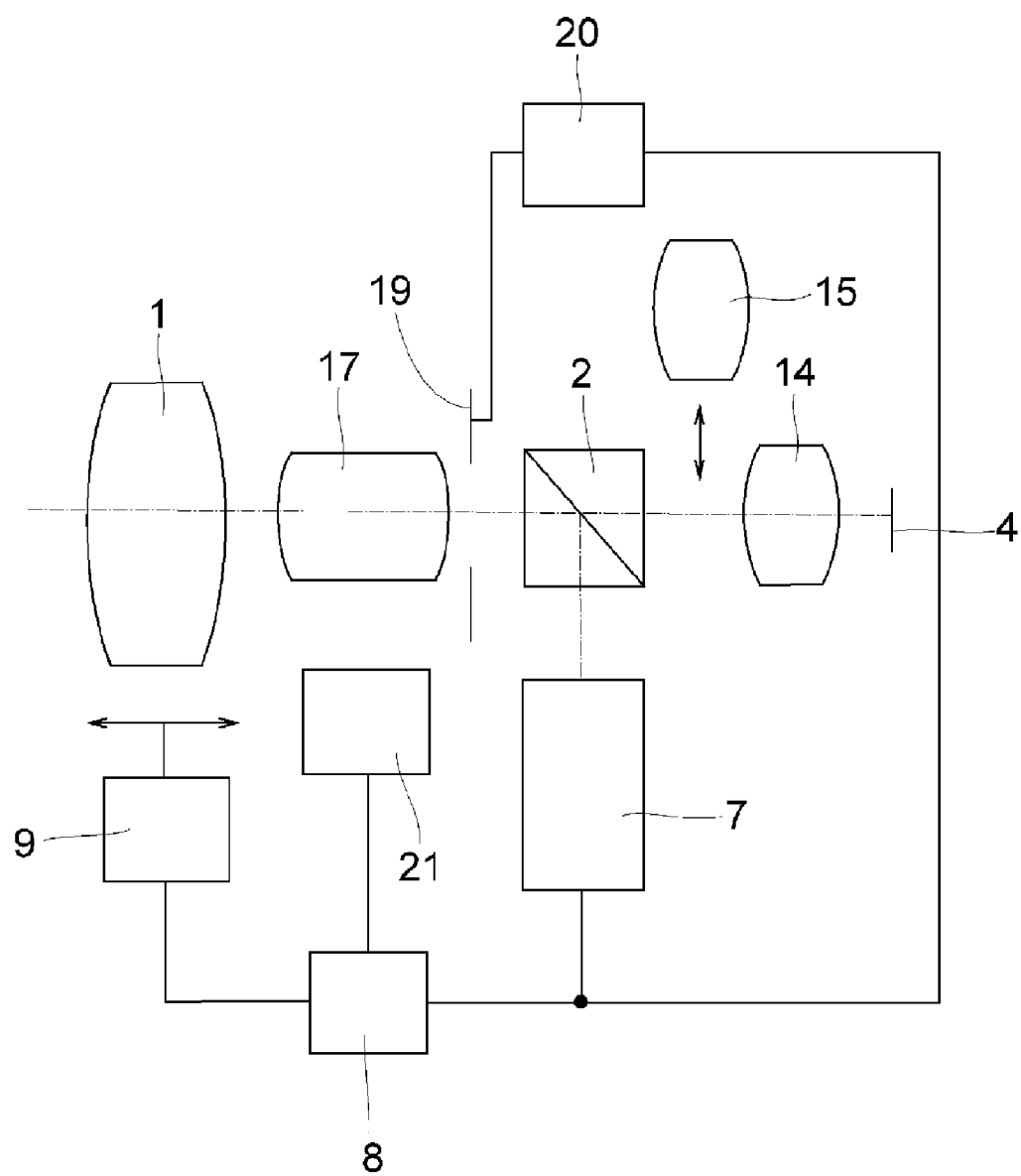
FIG. 22 shows a structure according to an eleventh embodiment.

FIG. 22 shows a structure according to an eleventh embodiment. The structure according to the eleventh embodiment comprises the components according to the tenth embodiment, and a magnification-changing-and-moving unit 17, an insertable-and-removable focal-length-changing optical system 15, a focal-length-changing optical system 14, and a zoom detector 21. The magnification-changing-and-moving unit 17 is inserted between the focus moving unit 1 and the stop 19. The focal-length-changing optical system 15 and the focal-length-changing optical system 14 are inserted in a light path between the branching optical system 2 and the image-pickup element 4. An output of the zoom detector 21 for the focal-length-changing optical system 17 is connected to the operational circuit 8.

A magnification change state is detected by the zoom detector 21, and, with a table of maximum FNo values corresponding to the detection values being provided, a focus detection precision PDe is made variable or is switched. The method of changing the focus detection precision PDe is the same as that in the tenth embodiment.

When the focal-length-changing optical system 15 is inserted or removed, the focus detection precision PDe is switched. F-number (FNo) 15 of a focusing optical system when the focal-length-changing optical system 15 is inserted is different from the FNo before the insertion, and is given by the following Expression (36):

$$FNo15 = FNo \cdot \beta 15 \tag{36}$$

The focal-length-changing optical system 15 corresponds to the magnification-changing optical system that changes magnification at the position c in FIG. 1. A focusing magnification ratio $R\beta$ prior to inserting the focal-length-changing optical system 15 is given by the following Expression (37):

$$R\beta 15 = R\beta / \beta 15 \tag{37}$$

Therefore, it is desirable that the focus detection precision PDe change in proportion to $FNo15 \cdot R\beta 152$, and satisfy the following Expression (38):

$$0.9 < PDe15 \cdot \beta 15 / PDe < 1.1 \tag{38}$$

When the focal-length-changing optical system 14 is inserted or removed, the focus detection precision PDe is switched. F-number (FNo) 14 of a focusing optical system when the focal-length-changing optical system 14 is inserted is different from the FNo before the insertion, and is given by the following Expression (39):

$$FNo14 = FNo \cdot \beta 14 \tag{39}$$

The focal-length-changing optical system 14 corresponds to the magnification-changing optical system that changes magnification at the position c in FIG. 1. A focusing magnification ratio $R\beta$ prior to mounting the focal-length-changing optical system 14 is given by the following Expression (40):

$$R\beta 15 = R\beta / \beta 14 \tag{40}$$

Therefore, it is desirable that the focus detection precision PDe changes in proportion to $FNo14 \cdot R\beta 142$, and satisfies the following Expression (41):

$$0.9 < (PDe14 \cdot \beta 15) / PDe < 1.1 \tag{41}$$

In the eleventh embodiment, a magnification change ratio $\beta 17$ of the magnification-changing-and-moving unit 17 is given by the following Expression (63), which is the same as Expression (55):

$$1.0 < \beta 17 < 10.0 \tag{63}$$

Since the relationship of a focus detectable range with respect to an image pickup range S does not change regardless of a magnification-changing operation by the magnification-changing-and-moving unit 17, the range A does not change.

As the magnification is changed by the magnification-changing-and-moving unit 17, a focus change amount $\Delta FD$ changes due to Expression (28). Therefore, in this embodiment, a driving amount ΔXDr is given by the following Expression (64):

$$\Delta XDr17 = 1.0 \cdot \Delta XDr \sim 0.01 \cdot XDr \quad (64)$$

Therefore, by setting the values of Expression (31) as in the following Formula (65) so that the driving amount ΔXDr17 is made variable, substantially the same focus controlling operations can be carried out before and after changing the magnification by the magnification-changing-and-moving unit 17:

$$\beta 172 \cdot XDr17(17) = 1.0 \quad (65)$$

In the eleventh embodiment, the focal-length change magnification β15 of the focal-length-changing optical system 15 is 2.0. When the focal-length-changing optical system 15 is inserted, the Expression used to determine a ratio RD15 of a focus detectable range with respect to an image pickup range changes from Expression (14) to Expression (66). Since a focus detectable range at a screen is different from that prior to the mounting, A2 is given by Expression (67) in the eleventh embodiment:

$$RD15 = RD/\beta 15 = 0.5 \cdot RD \quad (66)$$

$$A2 = 0.5 \cdot A0 \quad (67)$$

Accordingly, by setting the values of Expression (15) as in the following Expression (68) so that the focus detectable range is switched to A2, it is possible to maintain the focus detectable range before mounting the focal-length-changing optical system 15 substantially equal to that after mounting the focal-length-changing optical system 15:

$$\beta 15 \cdot A2/A0 = 1.0 \quad (68)$$

Driving amounts ΔXDr before and after the mounting of the focal-length-changing optical system 15 are the same.

In the eleventh embodiment, δ=0.01 mm and Rβ=0.5. CP=0.5, and is made to satisfy the condition in Expression (35), so that focusing is properly controlled. In addition, in the eleventh embodiment, in accordance with a detection value from the F-number detector 20, the focus detection precision PDe of the focus-state detection circuit 7 is changed on the basis of the following Expression (69):

$$PDe = 0.005 \cdot FNo \quad (69)$$

In the eleventh embodiment, the full aperture F-number changes as the magnification changes. At a wide-angle end, FNo is 1.4, and, at a telephoto end, FNo is 2.8. Table 1 shows full aperture F-numbers for respective zoom positions in the eleventh embodiment. When the detection value of the F-number detector 20 is in the range of from 1.4 to 2.8, the detection value from the zoom detector 21 is converted into an F number on the basis of Table 1, and the focus detection precision PDe is changed on the basis of Expression (69). This causes a proper focusing precision and a proper focusing speed to be achieved in accordance with FNo.

TABLE 1

| Magnification Change Ratio β17 | Full aperture F-number |
|---|---|
| 1 | 1.4 |
| 5 | 1.4 |
| 7 | 1.96 |
| 10 | 2.8 |

By switching the focus-state detection circuit 7, it is possible to easily switch a range A, the driving amount ΔXDr, and the focus detection precision PDe in accordance with shooting conditions.

When an image-pickup element having an image size S1 that is different from that of an image-pickup element 4 is used, a magnification ratio βS1 is given by the following Expression (18):

$$\beta S1 = S1/S0 \quad (18)$$

The ratio RD is given by the following Expression (19), and a range that can be occupied by a focus detection area at the screen is changed:

$$RDS1 = (A0/S1) \cdot R\beta \quad (19)$$
$$= RD/\beta S1$$

Accordingly, with RDS1≅RD as a result of switching the range that can be occupied by the focus detection area when the image-pickup element is used to A4, it is desirable that the following Expression (20) be satisfied in order to keep the range that can be occupied by the focus detection area at the screen when the image-pickup element is used substantially equal to the range that can be occupied by the focus detection area at the screen when the image-pickup element 4 is used:

$$0.9 < \beta S1 \cdot A4/A0 < 1.1 \quad (20)$$

When a horizontal length of the image pickup range or the range that can be occupied by the focus detection area is H and a vertical length thereof is V, an aspect ratio AR is given by the following Expression (21):

$$AR = H/V \quad (21)$$

When an aspect ratio of the image-pickup element 4 is AR0, and an image-pickup element having an aspect ratio AR2 that is different from that of the image-pickup element I0 is used, the following Expressions (22) and (23) are established:

$$\beta H2 = H2/H0 \quad (22)$$

$$\beta V2 = V2/V0 \quad (23)$$

However, when AR0=H0/V0 and AR2=H2/V2, ratios RD in the horizontal direction and vertical direction of the screen are given by the following Expressions (24) and (25), respectively, thereby causing the range that can be occupied by the focus detection area at the screen to change:

$$\text{Horizontal Direction: } RDH2 = (A0/S0) \cdot R\beta / \beta H2 \quad (24)$$
$$= RD/\beta H2$$

$$\text{Vertical Direction: } RDV2 = (A0/S0) \cdot R\beta / \beta v2 \quad (25)$$
$$= (RD/\beta v2)$$

Accordingly, by switching the area that can be occupied by the focus detection area to A5 (A5H, A5V), RDH2≅≅RD and RDV2≅RD, so that the range that can be occupied by the focus detection area at the screen when the image-pickup element is used is maintained substantially equal to the range that can be occupied by the focus detection area at the screen when the image-pickup element 4 is used. Therefore, when a horizontal range portion of the range A5 is A5H and a vertical range portion of the range A5 is A5V, it is desirable that the following Expressions (26) and (27) be satisfied:

$$0.9 < \beta H2 \cdot A5H/H0 < 1.1 \quad (26)$$

$$0.9 < \beta V2 \cdot A5V/V0 < 1.1 \quad (27)$$

According to the present invention, the focus detection precision PDe can be arbitrarily switched by a user, so that, depending upon the shooting state, the user can give priority to focusing precision than to focusing speed or to reduce focusing precision and increase focusing speed. In addition, if the focus detection precision PDe is deliberately set relatively high, it is possible to reduce focus hunting resulting from noise of a detection value, when, for example, S/N of the detection value is poor when, for example, an object is dark.

According to each of the foregoing embodiments, the range occupied by the focus detection area for focusing, the driving amount of the focus moving unit with respect to the focus-state detection value, and the focus detection precision of the focus-state detection circuit can be set, so that proper focusing can be carried out under various shooting conditions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-266060 filed Sep. 13, 2005, which is hereby incorporated by reference herein in its entirety.

What is claimed is:

1. A lens apparatus comprising:
an imaging optical system including a focus lens unit;
a branching optical unit disposed at the image side of the focus lens unit;
a focus-state detecting unit including a focus detecting element having a focus detection area that receives light beams from the branching optical unit, the focus-state detecting unit detecting a focus state using the focus detecting element;
an actuator that drives the focus lens unit in the optical axis direction of the focus lens unit;
a controller that controls the actuator, in accordance with an output from the focus-state detecting unit; and
a movable image-side optical unit disposed at the image side of the branching optical unit,
wherein the controller changes the size of the focus detection area of the focus detecting element within a range in accordance with the position of the image-side optical unit.

2. The lens apparatus according to claim 1, wherein the movable image-side optical unit is an extender optical system that is insertable into and removable from a light path of the imaging optical system, and the controller changes the size of the focus detection area of the focus detecting element in accordance with the insertion of the extender optical system into or the removal of the extender optical system from the light path of the imaging optical system.

3. The lens apparatus according to claim 1, wherein the movable image-side optical unit is a zoom optical system, and the controller changes the size of the focus detection area of the focus detecting element in accordance with a zoom position of the zoom optical system.

4. The lens apparatus according to claim 2, wherein the movable image-side optical unit is a zoom optical system, and the controller changes the size of the focus detection area of the focus detecting element in accordance with a zoom position of the zoom optical system.

5. An image pickup apparatus comprising:
a lens apparatus as claimed in claim 1; and
a camera including an image-pickup element that picks up an image from the lens apparatus.

6. A image pickup apparatus comprising:
a lens apparatus as claimed in claim 2; and
a camera including an image-pickup element that picks up an image from the lens apparatus.

7. An image pickup apparatus comprising:
a lens apparatus as claimed in claim 3; and
a camera including an image-pickup element that picks up an image from the lens apparatus.

8. An image pickup apparatus comprising:
a lens apparatus as claimed in claim 4; and
a camera including an image-pickup element that picks up an image from the lens apparatus.

* * * * *